US009826401B2

(12) United States Patent
Carames et al.

(10) Patent No.: US 9,826,401 B2
(45) Date of Patent: Nov. 21, 2017

(54) AUTHENTICATED COMMUNICATION SESSION FOR WIRELESS ROAMING

(71) Applicant: Verizon Patent and Licensing Inc., Arlington, VA (US)

(72) Inventors: Miguel A. Carames, Martinez, CA (US); Amol Tuli, Dublin, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/644,586

(22) Filed: Mar. 11, 2015

(65) Prior Publication Data

US 2016/0269899 A1 Sep. 15, 2016

(51) Int. Cl.
*H04W 12/06* (2009.01)
*H04W 8/02* (2009.01)
*H04W 12/12* (2009.01)

(52) U.S. Cl.
CPC .............. *H04W 12/06* (2013.01); *H04W 8/02* (2013.01); *H04W 12/12* (2013.01)

(58) Field of Classification Search
CPC .............................. H04W 12/06; H04L 63/029
See application file for complete search history.

(56) References Cited

U.S. PATENT DOCUMENTS

| 6,988,146 | B1* | 1/2006 | Magret | H04L 12/185 |
| | | | | 455/433 |
| 7,068,640 | B2* | 6/2006 | Kakemizu | H04L 12/4675 |
| | | | | 370/349 |
| 7,310,307 | B1* | 12/2007 | Das | H04L 12/66 |
| | | | | 370/229 |
| 8,149,805 | B2* | 4/2012 | Li | H04L 47/10 |
| | | | | 370/338 |
| 9,148,776 | B1* | 9/2015 | Schroeder | H04W 8/087 |
| 2005/0021781 | A1* | 1/2005 | Sunder | G06F 21/31 |
| | | | | 709/229 |

(Continued)

OTHER PUBLICATIONS

Majd et al., Split-Cache: A holistic caching framework for improved network performance in wireless ad hoc networks, Dec. 2014, Global Communications Conference (GLOBECOM), 2014 IEEE, p. 137-142.*

(Continued)

*Primary Examiner* — Luu Pham
*Assistant Examiner* — Harvey Cohen (57) ABSTRACT

A device forwards a set of packets between a first network device, associated with a first network, and a second network device, associated with a second network. The set of packets may be associated with permitting access, by a set of mobile devices connected to the first network, to the second network. The device may generate and store configuration information, identifying the set of mobile devices, based on the set of packets. The device may receive, from a third network device, a request associated with establishing a communication session between the third network device and a fourth network device associated with the second network, may determine, based on the configuration information, whether a particular mobile device, associated with the request, is permitted to establish the communication session, and may selectively create the communication session based on determining that the particular mobile device is permitted to establish the communication session.

20 Claims, 7 Drawing Sheets

(56) References Cited

U.S. PATENT DOCUMENTS

| | | | | |
|---|---|---|---|---|
| 2010/0313024 | A1* | 12/2010 | Weniger | H04L 63/0823 713/170 |
| 2011/0162060 | A1* | 6/2011 | Vijayakumar | H04L 12/413 726/13 |
| 2012/0294189 | A1* | 11/2012 | Sarikaya | H04W 60/005 370/254 |
| 2012/0311064 | A1* | 12/2012 | Deo | H04L 12/1403 709/213 |
| 2014/0150073 | A1* | 5/2014 | Bone | H04W 12/06 726/5 |
| 2014/0359740 | A1* | 12/2014 | Yoon | H04W 8/02 726/7 |

OTHER PUBLICATIONS

Yin et al., A caching-list based fast handoff mechanism in wireless mesh networks, Oct. 2013, IEEE, ICT Convergence (ICTC), 2013 International Conference on, pp. 402-407.*

Manulis et al., Authenticated wireless roaming via tunnels: making mobile guests feel at home, Mar. 2009, ACM, ASIACCS '09 Proceedings of the 4th International Symposium on Information, Computer, and Communications Security. pp. 92-103.*

Zapata et al., Virtual identities in authentication and authorization scenarios, Oct. 2006, ACM, PST '06 Proceedings of the 2006 International Conference on Privacy, Security and Trust: Bridge the Gap Between PST Technologies and Business Services.*

Knowledge Base, "Default Bearer Setup," https://sites.google.com/site/amitsciscozone/home/lte-notes/default-bearer-setup, Mar. 3, 2012, 5 pages.

Wikipedia, "GPRS roaming exchange," http://en.wikipedia.org/wiki/GPRS_roaming_exchange, May 31, 2014, 2 pages.

What-when-how, "Inter-PLMN Connectivity (Roaming in GPRS and 3G Networks)," http://what-when-how.com/roaming-in-wireless-networks/inter-plmn-connectivity-roaming-in-gprs-and-3g-networks/, Jan. 11, 2011, 5 pages.

Wikipedia, "IP exchange," http://en.wikipedia.org/wiki/IP_exchange, Oct. 1, 2014, 5 pages.

RCR Wireless: Intelligence on All Things Wireless, "LTE Attach Procedure Call Flow Address the Basics of Attach Procedures," http://www.rcrwireless.com/20140509/wireless/lte-attach-procedure-call-flow, May 9, 2014, 4 pages.

EventHelix, "LTE Attach and Default Bearer Setup Messaging," http://www.eventhelix.com/lte/attach/LTE-Attach-Messaging.pdf, Aug. 25, 2012, 14 pages.

Kamesh, "Initial Network Attach—EPC specific callflow with TEIDs," http://wirelessanchor.blogspot.com/, Jan. 30, 2012, 4 pages.

Department of Commerce: Public Safety Communications Research, "Network Identifiers & PLMN ID Myths APCO 2011," http://www.pscr.gov/about_pscr/highlights/apco_2011/APCO_2011_NetworkIdentifiers-Tue.pdf, Oct. 5, 2011, 14 pages.

Wikipedia, "System Architecture Evolution," http://en.wikipedia.org/wiki/System_Architecture_Evolution, Jun. 10, 2014, 9 pages.

* cited by examiner

FIG. 5F though an intermediate device and/or network (e.g., a "backbone network"). The visited network may also exchange information with the home network, via the backbone network, to establish a communication connection between the mobile device and the home network.

AUTHENTICATED COMMUNICATION SESSION FOR WIRELESS ROAMING

BACKGROUND

A user of a mobile device may subscribe to mobile services provided by a home network operator operating a home network. Sometimes, the user may operate the mobile device on another mobile network, (e.g., a "visited network"). The visited network may retrieve information, associated with the user's mobile services subscription, from the home network through an intermediate device and/or network (e.g., a "backbone network"). The visited network may also exchange information with the home network, via the backbone network, to establish a communication connection between the mobile device and the home network.

DETAILED DESCRIPTION OF PREFERRED EMBODIMENTS

The following detailed description of example implementations refers to the accompanying drawings. The same reference numbers in different drawings may identify the same or similar elements.

A wireless mobile device may roam outside its home network and access a visited network. A mobility management entity device (MME), associated with the visited network, may identify the mobile device and exchange information (e.g., using the diameter protocol) with a home subscriber server (HSS), associated with the mobile device's home network, to authenticate the mobile device and to determine a roaming configuration associated with the mobile device. The MME may direct a serving gateway (SGW), associated with the visited network, to create a general packet radio service (GPRS) tunnel, for the mobile device, between the SGW and a packet data network gateway (PGW) associated with the home network. The roaming mobile device may, thus, exchange data with the home network through the GPRS tunnel.

An improperly or maliciously configured mobile device may create an unauthorized GPRS tunnel and/or interfere with another mobile device's GPRS tunnel by transmitting anomalous packets to the SGW and/or PGW. The GPRS tunneling protocol (GTP), used to create and send data through the GPRS tunnel, lacks provisions for detecting anomalous packets. However, an intermediate device, by which communications between the visited network and the home network may be routed, may identify, from the communications, authentication and configuration information associated with a mobile device. The intermediate device may maintain a record of valid authentications and configurations for mobile devices and may detect and drop anomalous GTP packets by comparing information within the GTP packets to the authentication and configuration records maintained. Thus, the intermediate device may enable the visited network and the home network to establish an authenticated communication session for wireless roaming.

Figure 1:
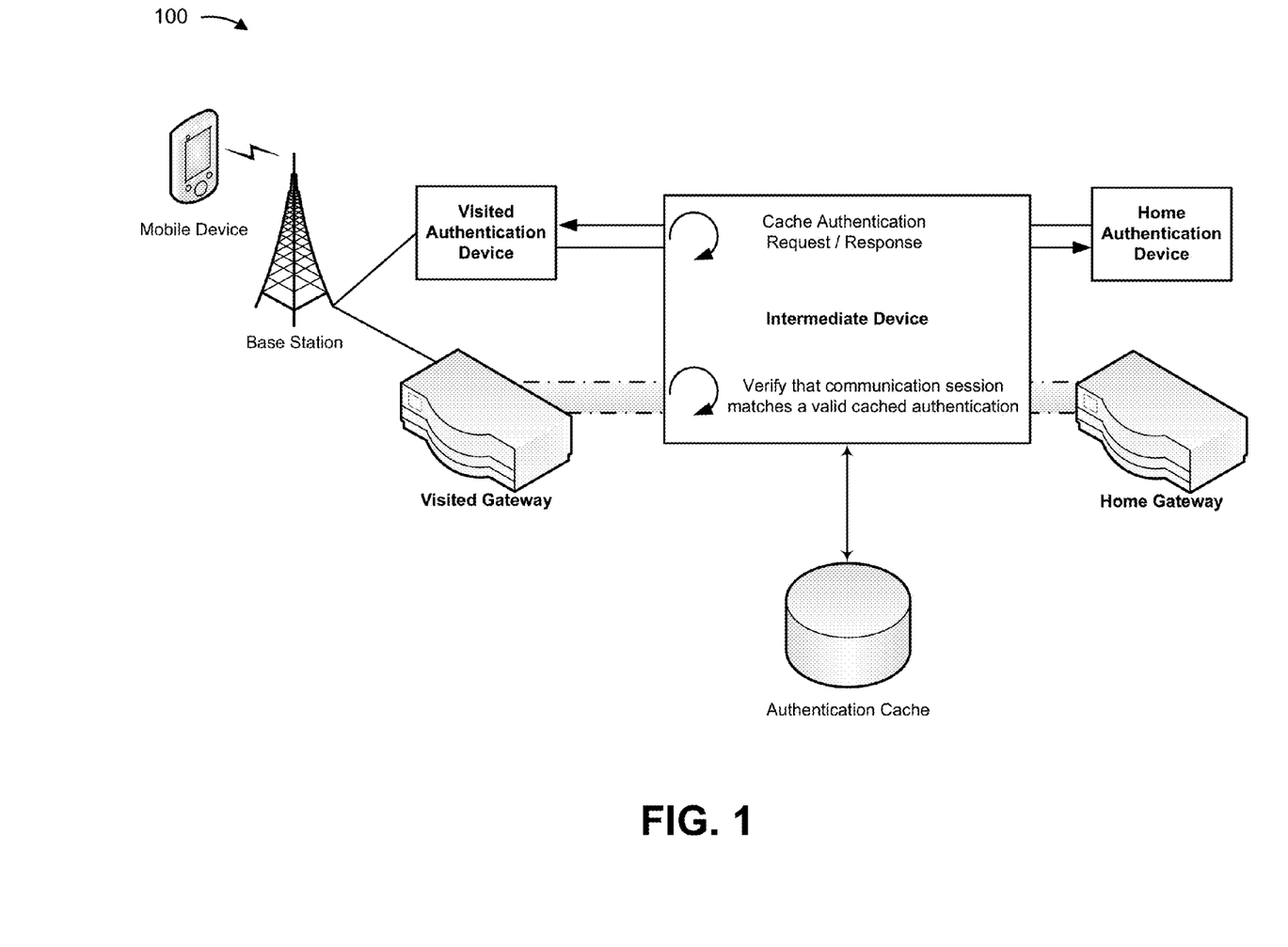
FIG. 1 is a diagram of an overview of an example implementation described herein.

FIG. 1 is a diagram of an overview of an example implementation 100 described herein. As shown in FIG. 1, a mobile device may communicate, through a base station, with a visited authentication device. The visited authentication device may identify a home authentication device, associated with the mobile device, and may send an authentication request to the home authentication device. The home authentication device may receive the authentication request through an intermediate device and may send a corresponding authentication response via the same route. The intermediate device may store both the authentication request and the corresponding authentication response in an authentication cache.

A visited gateway may initiate a communication session with the home gateway for use by the mobile device. The intermediate device may intercept a signal associated with initiating the communication session and may verify that information contained in the signal matches information contained in a valid authentication request-response stored in the authentication cache. The intermediate device may allow the visited gateway to establish the communication session with the home gateway if the signal matches a valid authentication request-response. Alternatively, the intermediate device may refuse to establish the communication session if the signal does not match a valid authentication request-response.

In some implementations, in addition to correlating diameter and GTP sessions, the systems and/or methods may correlate a voice over long term evolution (VoLTE)/session initiation protocol (SIP) session with existing diameter and GTP sessions.

By establishing an authentication cache in an intermediate device through which authentication and communication connection signals are forwarded, the intermediate device may restrict the creation and use of communication connections to those for which a valid authentication exists. The intermediate device may thus protect the network from abuse by malicious users and/or misconfigured devices.

Figure 2:
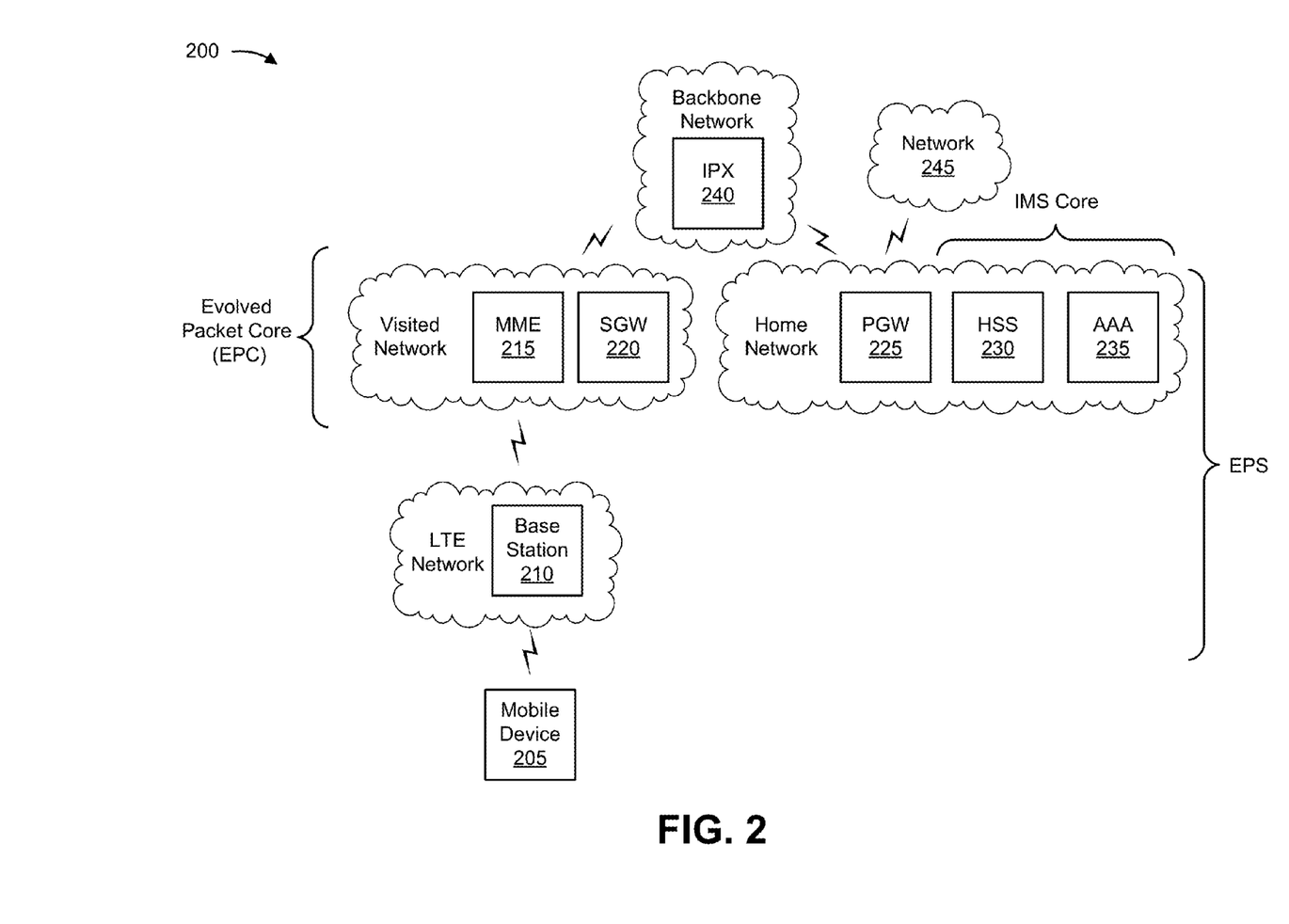
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a mobile device 205; a base station 210; a MME 215; a SGW 220; a PGW 225; a HSS 230; an authentication, authorization, and accounting server (AAA) 235; an internet protocol exchange node (IPX) 240; and a network 245. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network.

Environment 200 may include an evolved packet system (EPS) that includes an LTE network, a backbone network, and/or an evolved packet core (EPC) that operate based on a third generation partnership project (3GPP) wireless communication standard. The EPC may include a home network and a visited network connected via a backbone network. The LTE network may include a radio access network (RAN) that includes one or more base stations 210 that take the form of evolved Node Bs (eNBs) via which mobile device 205 communicates with the EPC. The EPC may include MME 215, SGW 220, and/or PGW 225 that enable mobile device 205 to communicate with network 245 and/or an Internet protocol (IP) multimedia subsystem (IMS) core. The IMS core may include HSS 230 and/or AAA 235, and may manage device registration and authentication, session initiation, etc., associated with mobile devices 205. HSS 230 and/or AAA 235 may reside in the EPC and/or the IMS core. The backbone network may include IPX 240.

Mobile device 205 may include one or more devices capable of communicating with base station 210 and/or a network (e.g., network 245). For example, mobile device 205 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, and/or a similar device. Mobile device 205 may send traffic to and/or receive traffic from network 245 (e.g., via base station 210, SGW 220, PGW 225, and/or IPX 240).

Base station 210 may include one or more devices capable of transferring traffic, such as audio, video, text, and/or other traffic, destined for and/or received from mobile device 205. In some implementations, base station 210 may include an eNB associated with the LTE network that receives traffic from and/or sends traffic to network 245 via SGW 220 and/or PGW 225. Additionally, or alternatively, one or more base stations 210 may be associated with a RAN that is not associated with the LTE network. Base station 210 may send traffic to and/or receive traffic from mobile device 205 via an air interface. In some implementations, base station 210 may include a small cell base station, such as a base station of a microcell, a picocell, and/or a femtocell.

MME 215 may include one or more devices, such as one or more server devices, capable of managing authentication, activation, deactivation, and/or mobility functions associated with mobile device 205. In some implementations, MME 215 may perform operations relating to authentication of mobile device 205. Additionally, or alternatively, MME 215 may facilitate the selection of a particular SGW 220 and/or a particular PGW 225 to serve traffic to and/or from mobile device 205. MME 215 may perform operations associated with handing off mobile device 205 from a first base station 210 to a second base station 210 when mobile device 205 is transitioning from a first cell associated with the first base station 210 to a second cell associated with the second base station 210. Additionally, or alternatively, MME 215 may select another MME (not pictured), to which mobile device 205 should be handed off (e.g., when mobile device 205 moves out of range of MME 215).

SGW 220 may include one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 may aggregate traffic received from one or more base stations 210 associated with the LTE network, and may send the aggregated traffic to network 245 (e.g., via PGW 225 and/or IPX 245) and/or other network devices associated with the visited network, home network, backbone network, EPC, and/or the IMS core. SGW 220 may also receive traffic from network 245 and/or other network devices, and may send the received traffic to mobile device 205 via base station 210. Additionally, or alternatively, SGW 220 may perform operations associated with handing off mobile device 205 to and/or from an LTE network. In some implementations, SGW 220 may process and/or transfer data packets associated with audio and/or video communication (e.g., data packets associated with a voice over internet protocol (VoIP) service, a voice over LTE (VoLTE) service, a video telephony service, or the like). Alternatively, or additionally, SGW 220 may process and/or transfer data packets associated with control information.

PGW 225 may include one or more devices capable of providing connectivity for mobile device 205 to external packet data networks (PDNs) (e.g., other than the depicted visited network, home network, backbone network, EPC, and/or LTE network). For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to network 245. Additionally, or alternatively, PGW 225 may receive traffic from network 245, and may send the traffic to mobile device 205 via SGW 220 and base station 210. PGW 225 may record data usage information (e.g., byte usage), and may provide the data usage information to AAA 235. In some implementations, PGW 225 may process and/or transfer data packets associated with audio and/or video communication (e.g., data packets associated with a VoIP service, a VoLTE service, a video telephony service, or the like). Alternatively, or additionally, PGW 225 may process and/or transfer data packets associated with control information.

HSS 230 may include one or more devices, such as one or more server devices, capable of managing (e.g., receiving, generating, storing, processing, and/or providing) information associated with mobile device 205. For example, HSS 230 may manage subscription information associated with mobile device 205, such as information that identifies a subscriber profile of a user associated with mobile device 205, information that identifies services and/or applications that are accessible to mobile device 205, location information associated with mobile device 205, a network identifier (e.g., a network address) that identifies mobile device 205, information that identifies a treatment of mobile device 205 (e.g., quality of service information, a quantity of minutes allowed per time period, a quantity of data consumption allowed per time period, etc.), and/or similar information. HSS 230 may provide this information to one or more other devices of environment 200 to support the operations performed by those devices.

AAA 235 may include one or more devices, such as one or more server devices, that perform authentication, authorization, and/or accounting operations for communication sessions associated with mobile device 205. For example, AAA 235 may perform authentication operations for mobile device 205 and/or a user of mobile device 205 (e.g., using one or more credentials), may control access, by mobile device 205, to a service and/or an application (e.g., based on one or more restrictions, such as time-of-day restrictions, location restrictions, single or multiple access restrictions, read/write restrictions, etc.), may track resources consumed by mobile device 205 (e.g., a quantity of voice minutes consumed, a quantity of data consumed, etc.), and/or may perform similar operations.

IPX 240 may include one or more devices (e.g., one or more traffic transfer devices) capable of processing, transferring, and/or storing traffic between devices of environment 200 (e.g., between mobile device 205, base station 210, MME 215, SGW 220, PGW 225, and/or HSS 230). For example, IPX 240 may include a firewall, a router, a gateway, a switch, a hub, a bridge, a reverse proxy, a server (e.g., a proxy server), a security device, an intrusion detection device, a load balancer, or a similar device.

Network 245 may include one or more wired and/or wireless networks. For example, network 245 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. For example, although FIG. 2 shows, for clarity, certain devices as being associated with the visited network and other devices as being associated with the home network, it is to be understood that the visited network and the home network may each include and/or be associated with the same or similar devices and/or networks, such as one or more mobile devices 205, base stations 210, MMEs 215, SGWs 220, PGWs 225, HSSs 230, AAAs 235, or the like. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
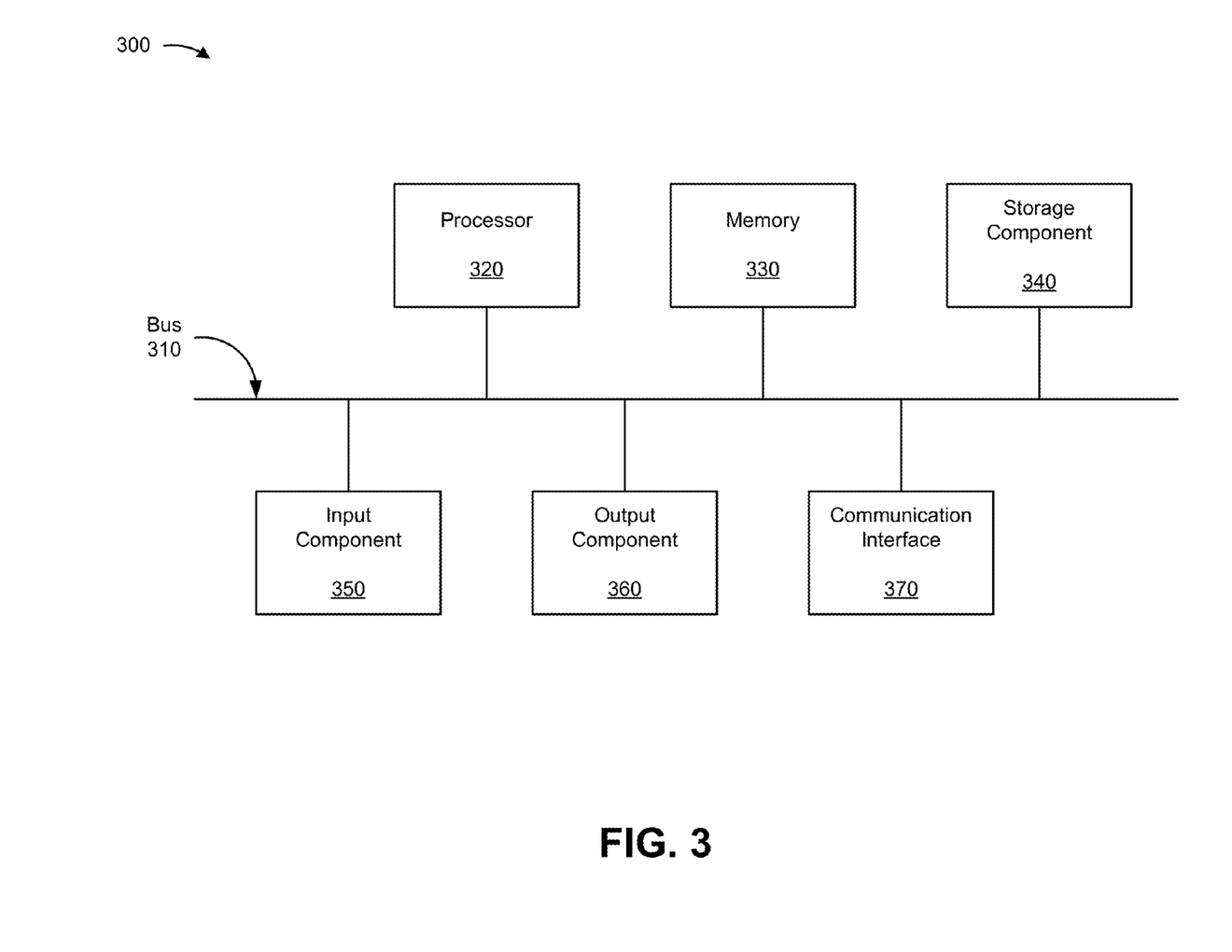
FIG. 3 is a diagram of example components of one or more devices of FIG. 2.

FIG. 3 is a diagram of example components of a device 300. Device 300 may correspond to mobile device 205, base station 210, MME 215, SGW 220, PGW 225, HSS 230, AAA 235 and/or IPX 240. In some implementations, mobile device 205, base station 210, MME 215, SGW 220, PGW 225, HSS 230, AAA 235 and/or IPX 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
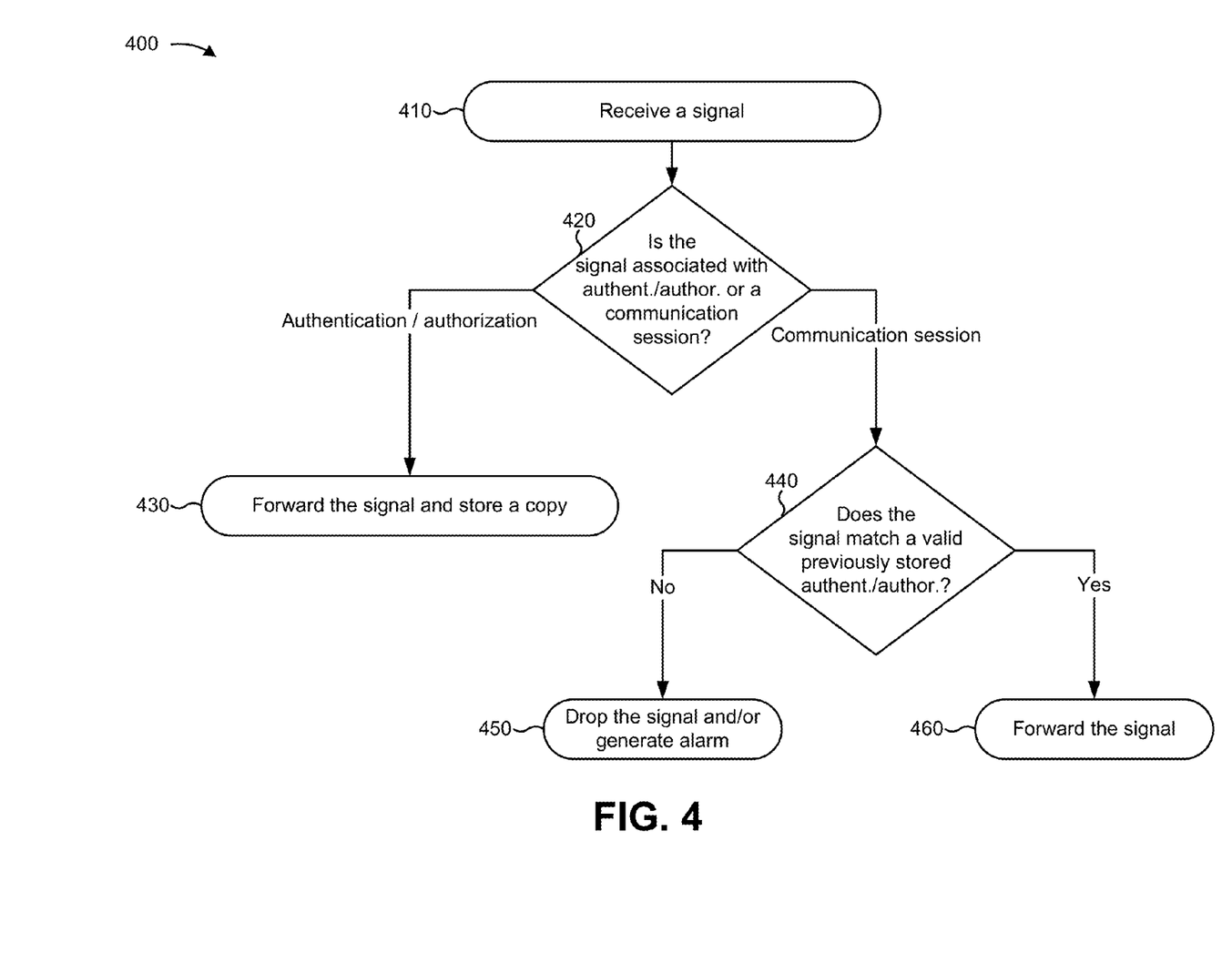
FIG. 4 is a flow chart of an example process for authenticating a communication session for wireless roaming.

FIG. 4 is a flow chart of an example process 400 for authenticating a communication session for wireless roaming. In some implementations, one or more process blocks of FIG. 4 may be performed by IPX 240. In some implementations, one or more process blocks of FIG. 4 may be performed by another device or a group of devices separate from or including IPX 240, such as mobile device 205, base station 210, MME 215, SGW 220, PGW 225, HSS 230, and/or AAA 235.

As shown in FIG. 4, process 400 may include receiving a signal (block 410). For example, IPX 240 may receive one or more packets representing a signal sent between a device associated with a visited network (e.g., mobile device 205, base station 210, MME 215, and/or SGW 220) and another device associated with a home network (e.g., PGW 225, HSS 230, and/or AAA 235). In some implementations, IPX 240 may operate as a relay, forwarding signals between a sending device and a receiving device. Alternatively, or additionally, IPX 240 may monitor and/or receive signals sent through one or more other devices associated with the backbone network (e.g., another IPX 240). In some implementations, IPX 240 may receive and/or monitor signals associated with a particular visited network, a particular home network, and/or a particular connection between a visitor network and a home network. By receiving signals transferred between devices of environment 200, IPX 240 may monitor an authentication and/or configuration associated with mobile device 205 and may detect attempts to create and/or use a communication session by mobile device 205.

As further shown in FIG. 4, process 400 may include determining whether the signal is associated with authentication or a communication session (block 420). For example, IPX 240 may determine whether the signal is associated with authentication or a communication session based on packet header information associated with the signal. In some implementations, IPX 240 may be associated with an authentication service and may determine whether the signal is associated with the authentication service. For example, IPX 240 may be associated with a diameter agent (e.g., as a relay, proxy, redirect, and/or translation agent) and may determine that diameter protocol signals are associated with authentication. In some implementations, a signal associated with authentication may include an "update location request" (e.g., received from MME 215) and/or an "update location answer" (e.g., received from HSS 230). Alternatively, or additionally, IPX 240 may identify an authentication signal associated with one or more other authentication, authorization, and/or accounting protocols (e.g., RADIUS). An authentication signal may include a request (e.g., from a visited network) and a corresponding answer (e.g., from a home network).

In some implementations, IPX 240 may be associated with a communication forwarding service and may determine whether the signal is associated with the communication forwarding service. For example, IPX 240 may be associated with a GPRS roaming exchange (GRX) node and may determine that GTP protocol (e.g., GTP-C, GTP-U, GTP', or the like) signals are associated with a communication session. Alternatively, or additionally, IPX 240 may identify a communication session signal associated with one or more other communication tunneling protocols. In some implementations, a signal associated with a communication session may include a control signal (e.g., using GTP-C protocol) to establish and/or modify a communication tunnel (e.g., a create session request, a create session response, a modify bearer request, and/or a modify bearer response). Alternatively, or additionally, a signal associated with a communication session may include a user data signal (e.g., using GTP-U protocol), containing an encapsulated user data packet, transferred through an existing communication tunnel (e.g., a GTP tunnel).

By determining whether the signal is associated with authentication or a communication session, IPX 240 may detect authentications and/or communication sessions associated with mobile device 205.

As further shown in FIG. 4, process 400 may include forwarding the signal and saving a copy thereof (block 430) based on determining that the signal is associated with authentication (block 420="Authentication"). For example, IPX 240 may determine that a particular signal is an authentication request (e.g., an update location request) to be directed toward a recipient (e.g., HSS 230), may store a copy of the request, and may forward the request to the recipient. Alternatively, or additionally, IPX 240 may determine that the particular signal is an authentication response (e.g., an update location answer) to be directed toward a recipient (e.g., MME 215), may store a copy of the response, and may forward the response to the recipient. In some implementations, IPX 240 may determine, for each authentication request and/or response, whether a corresponding response and/or request, respectively, exists. Alternatively, or additionally, IPX 240 may compare information included in and/or associated with an authentication request with corresponding information included in and/or associated with a corresponding authentication response. For example, IPX 240 may generate an entry, in an authentication and/or configuration data structure, based on receiving an authentication request and may update the entry based on receiving a corresponding authentication response. In some implementations, an authentication request and/or response may include information associated with identifying mobile device 205 (e.g., an international mobile subscriber identity (IMSI), a mobile station international subscriber directory number (MSISDN), or the like). Alternatively, or additionally, an authentication request and/or response may include information associated with identifying one or more other devices and/or networks (e.g., MME 215, PGW 225, HSS 230, the visited network, and/or the home network). In this way, IPX 240 may store requested and/or approved authentication information associated with obtaining permission for mobile device 205 to use one or more network resources.

As further shown in FIG. 4, process 400 may include determining whether the signal matches a valid previously stored authentication (block 440) based on determining that the signal is associated with a communication session (block 420="Communication session"). In some implementations, IPX 240 may determine whether an identifier, associated with the signal, corresponds to an identifier included in a previously stored authentication. For example, IPX 240 may determine, from the signal, identifying information associated with authenticating mobile device 205 (e.g., an IMSI, a MSISDN, an IP address, or the like) and may determine whether a previously stored authentication request and/or response contains the identifying information. Alternatively, or additionally, IPX 240 may determine whether the signal identifies one or more other devices, of environment 200, which are associated with a previously stored authentication. For example, IPX 240 may determine whether the signal is associated with a communication session between an SGW 220 and/or a PGW 225 identified by a previously stored authentication request and/or corresponding response (e.g., within an access point name (APN) configuration profile). In some implementations, IPX 240 may determine whether one or more other signals, associated with the signal, are associated with a valid previously stored authentication. For example, IPX 240 may determine that the signal is associated with a particular tunnel identifier included in the signal, and may determine whether the particular tunnel identifier is associated with a valid previously stored authentication based on determining whether another signal, which includes the tunnel identifier, is associated with a valid previously stored authentication.

In some implementations, IPX 240 may determine whether a previously stored authentication is valid. For example, IPX 240 may determine whether an authentication response satisfies a corresponding authentication request, whether an authentication satisfies a timeout threshold, and/or whether the authentication has been modified and/or revoked by a subsequent authentication.

In this way, IPX 240 may detect an anomalous communication session signal by determining whether valid previously stored authentication information corroborates information contained in a communication session signal.

As further shown in FIG. 4, process 400 may include dropping the signal and/or generating an alarm (block 450) based on determining that the signal does not match a valid previously stored authentication (block 440=No). For example, IPX 240 may drop the signal by blocking the signal and/or otherwise preventing the signal from being transmitted toward a destination associated with the signal (e.g., SGW 220 and/or PGW 225). Alternatively, or additionally, IPX 240 may generate an alarm. For example, IPX 240 may send a message, identifying the anomalous communication session signal, to another device (e.g., to a mobile device 205, a network server, and/or another device). In some implementations, IPX 240 may prevent a mobile device 205, associated with the signal, from accessing one or more resources and/or establishing a communication session with one or more devices of environment 200. For example, IPX 240 may identify mobile device 205 in a black list. In this way, IPX 240 may prevent mobile device 205 from creating and/or using a communication session without a valid corresponding authentication.

As further shown in FIG. 4, process 400 may include forwarding the signal (block 460) based on determining that the signal matches a valid previously stored authentication (block 440=No). For example, IPX 240 may forward the signal by transmitting the signal toward a destination associated with the signal (e.g., SGW 220 and/or PGW 225). Alternatively, or additionally, may forward subsequent signals, associated with the signal, in order to facilitate the creation and/or use of the communication session. In this way, IPX 240 may allow mobile device 205 to create and/or use a communication session with a valid corresponding authentication.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5F are diagrams of example implementations 500-520 relating to example process 400 shown in FIG. 4. FIGS. 5A-5F show examples of authenticating a communication session for wireless roaming.

Figure 5A:
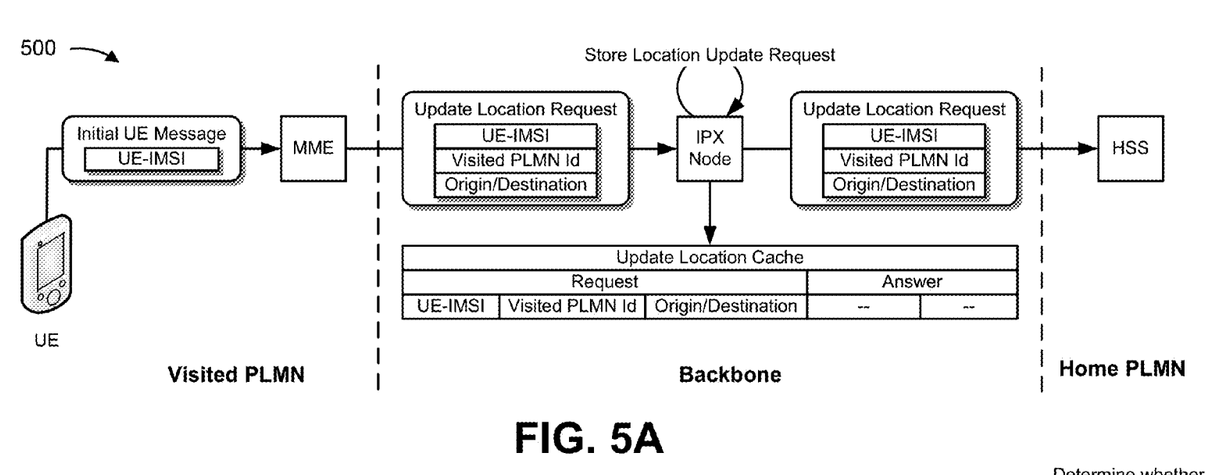
FIGS. 5A-5F are diagrams of an example implementation relating to the example process shown in FIG. 4.

As shown in FIG. 5A, assume, for example implementation 500, that a user equipment (UE) (e.g., mobile device 205), associated with a home PLMN, establishes a connection with a visited PLMN (e.g., via a base station 210, not shown) associated with an EPC operating according to a 3GPP LTE wireless communication standard. Assume further that the UE sends, to an MME (e.g., MME 215) associated with the visited PLMN, an initial UE message including an IMSI associated with the UE (shown as "UE-IMSI"). Based on receiving the initial UE message, the MME sends, to an HSS (e.g., HSS 230), associated with the home PLMN, an update location request including the IMSI associated with the UE ("UE-IMSI"), a Visited PLMN identifier (shown as "Visited PLMN Id"), and information associated with an origin/destination. Assume that an IPX node (e.g., IPX 240), associated with a backbone, interconnects the MME with the HSS. Assume further that the IPX node receives the update location request from the MME, stores a copy of the update location request in an update location cache, and forwards the update location request to the HSS.

Figure 5B:
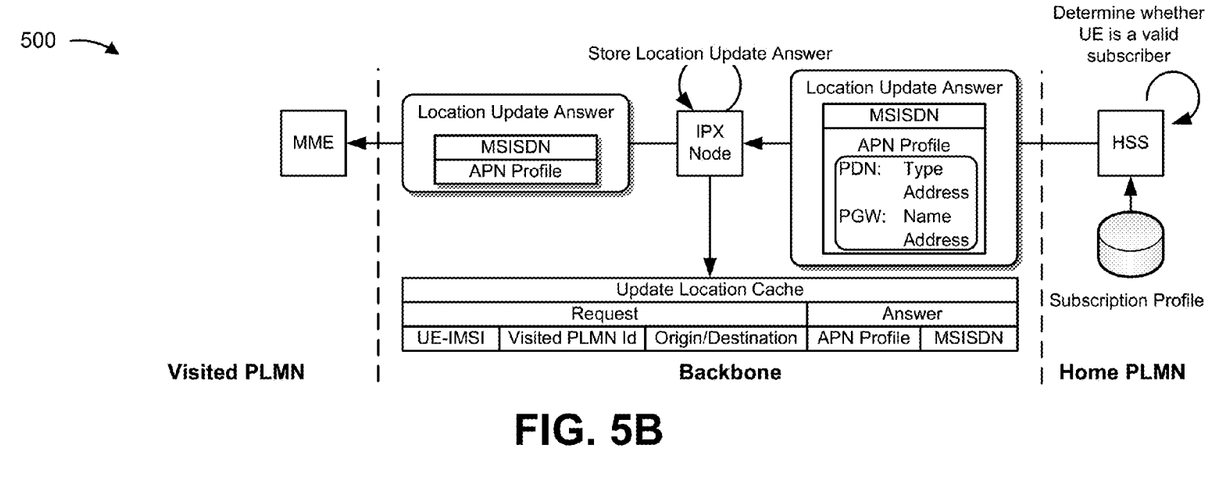

As shown in FIG. 5B, assume, for example implementation 500, that, based on receiving the update location request, the HSS determines that that the UE is a valid subscriber associated with the home network and sends, to the MME via the IPX node, an update location answer including a result code ("success"), an MSISDN and an APN Profile associated with the UE. Assume that the APN Profile includes configuration information, associated with implementing a communication tunnel to connect the UE to a PDN via the home PLMN, which identifies a type associated with the PDN; an address associated with the UE's use of the PDN; a name associated with a PGW connected to the PDN; and an address associated with accessing the PGW. Assume that the IPX node receives the update location answer from the HSS, stores a copy of the update location answer in the update location cache, and forwards the update location answer to the MME.

Figure 5C:
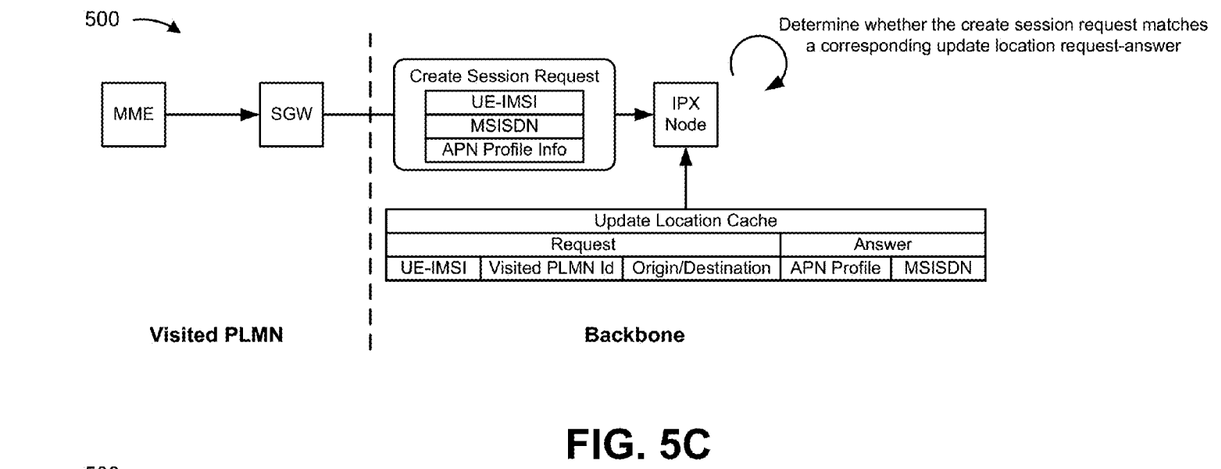

As shown in FIG. 5C, assume, for example implementation 500, that, based on receiving the update location answer, the MME sends, to a SGW associated with the visited PLMN (e.g., SGW 220), a create session request including the UE IMSI, the MSISDN, and information associated with the APN Profile. Assume further that the SGW sends a corresponding create session request to a PGW associated with the home network (e.g., PGW 225). Assume that the IPX node receives the create session request and determines whether the create session request matches a corresponding update location request and answer based on information included in the create session request and information included in the update location cache.

Figure 5D:
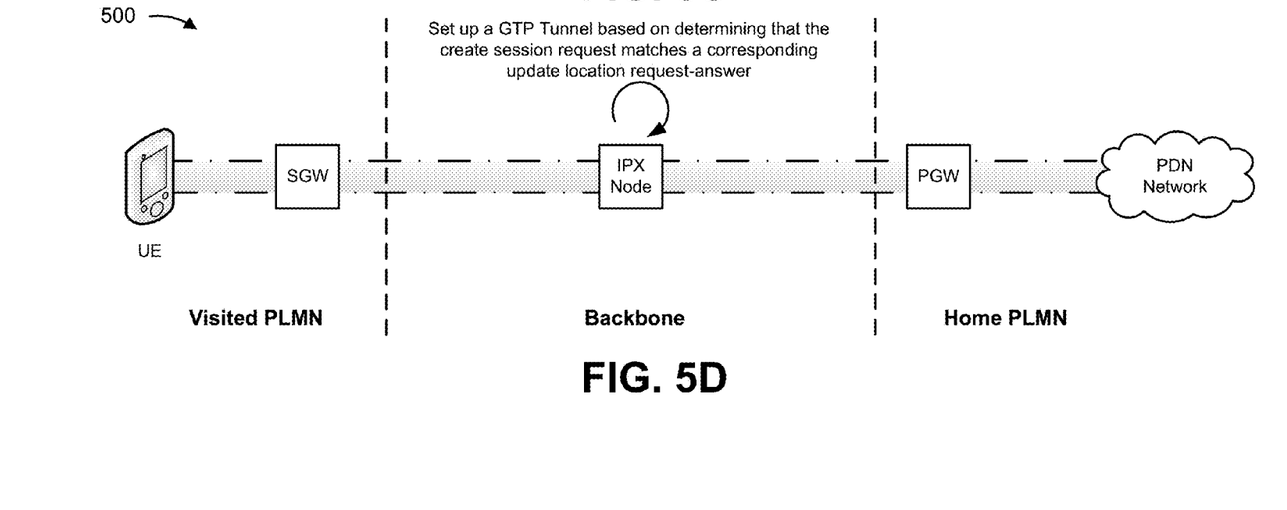

As shown in FIG. 5D, assume, for example implementation 500, that, based on determining that the create session request matches a corresponding update location request and answer, the IPX node forwards the create session request to the PGW. Assume further that, based on the update location cache, the IPX node authenticates and forwards subsequent create session requests and/or responses and/or subsequent modify bearer requests and/or responses to establish a communication session tunnel connecting the UE to a PDN network (e.g., network 245) via the SGW, the IPX node, and the PGW. In this way, the IPX node allows the UE to create and/or use a communication session tunnel based on determining, using the update location cache, that the UE has been authenticated by the HSS.

Figure 5E:
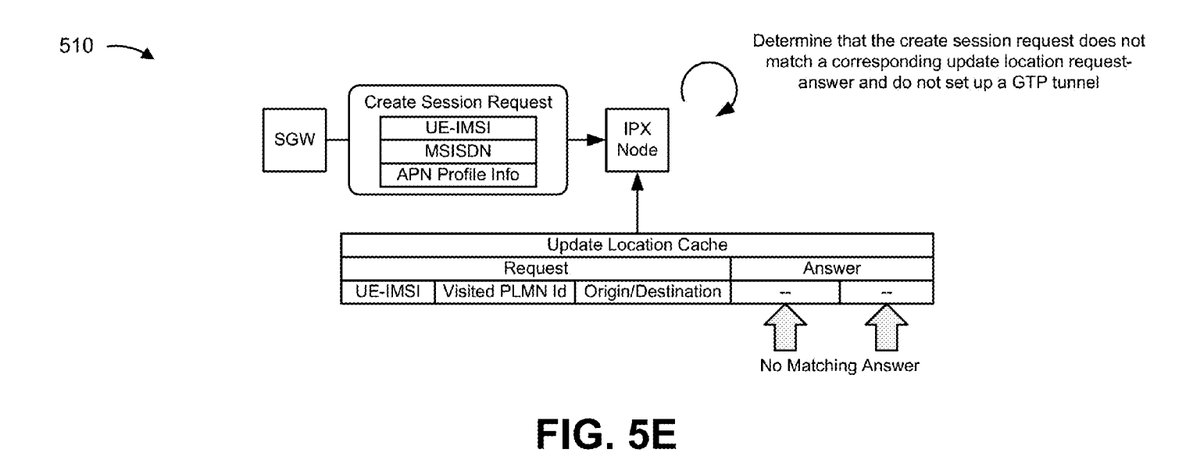

As shown in FIG. 5E, assume, for example implementation 510, that the SGW sends, to the PGW, a create session request including the UE IMSI, the APN Profile, and the MSISDN. Assume further that the IPX node receives the create session request and determines that the update location cache includes an update location request associated with the create session request but does not include a corresponding update location answer. Thus, the IPX node determines that the create session request does not match a corresponding update location request-answer and does not forward the create session request to the PGW, preventing the establishment of a GTP tunnel for the UE. In this way, the IPX node may prevent the creation of a communication session tunnel if the MME has not authenticated the UE.

Figure 5F:
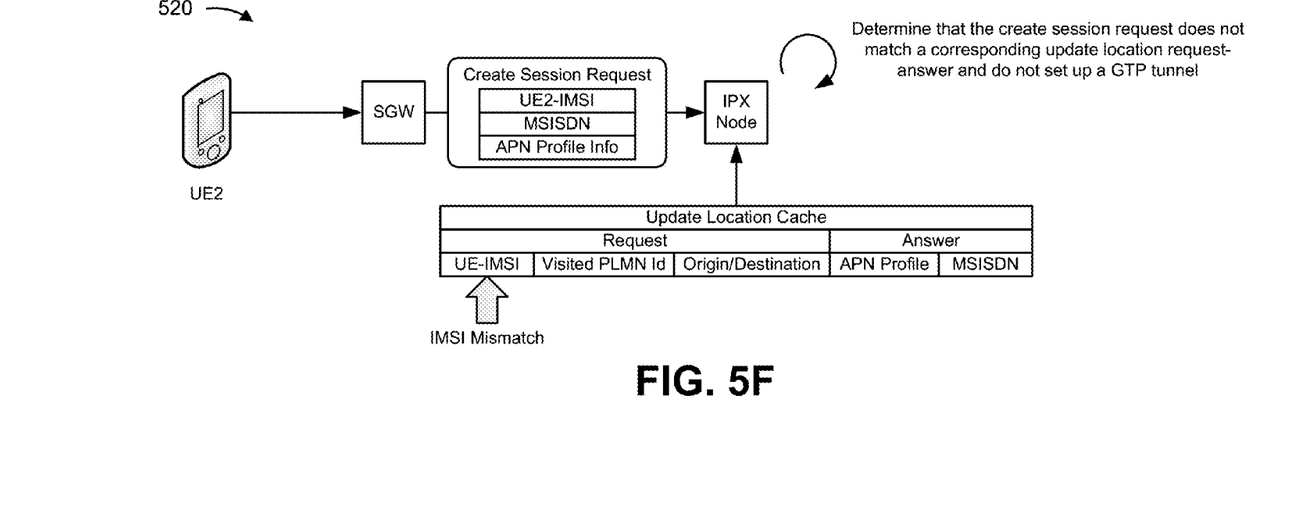

As shown in FIG. 5F, assume, for example implementation 520, that a second UE (e.g., another mobile device 205, shown as UE2) attempts to send, to the PGW via the SGW, an anomalous create session request identifying an IMSI associated with UE2 (e.g., UE2-IMSI) but the APN Profile and MSISDN associated with the UE. Assume further that the IPX node receives the create session request and determines that the update location cache includes an update location answer associated with the APN profile and the MSISDN but determines that the IMSI included in the create session request (e.g., UE2-IMSI) does not match the IMSI included in a corresponding update location answer (e.g., UE-IMSI). Thus, the IPX node determines that the create session request does not match a corresponding update location request-answer and does not forward the create session request to the PGW, preventing the establishment of a GTP tunnel for UE2. In this way, the IPX node may prevent the creation of a communication session tunnel for an anomalous create session request which includes information which does not match a previous update location request and/or answer.

As indicated above, FIGS. 5A-5F are provided merely as examples. Other examples are possible and may differ from what was described with regard to FIGS. 5A-5F.

Implementations described herein may assist a network operator with authenticating communication sessions made by roaming wireless mobile devices. By authenticating communication sessions, the network operator may prevent malicious users and/or misconfigured devices from abusing and/or disrupting network resources.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

As used herein, a packet may refer to a communication structure for communicating information, such as a protocol data unit (PDU), a packet, a frame, a datagram, a segment, a message, a block, a cell, a frame, a subframe, a slot, a symbol, a portion of any of the above, and/or another type of formatted or unformatted unit of data capable of being transmitted via a network.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising: one or more processors, at least partially implemented in hardware, to:
   receive a plurality of authentication requests;
   receive a plurality of authentication responses corresponding to the plurality of authentication requests;
   store authentication information associated with the plurality of authentication requests and the plurality of authentication responses;
   receive a communication session signal;
   determine, based on the authentication information, whether the communication session signal is associated with a particular authentication request and corresponding authentication response of the plurality of authentication requests and the plurality of authentication responses;
   determine, when the communication session signal is associated with the particular authentication request and the corresponding authentication response, whether the particular authentication request and the corresponding authentication response are valid based on whether a particular authentication, associated with the particular authentication request and the corresponding authentication response, satisfies a timeout threshold; and
   selectively forward the communication session signal when the particular authentication request and the corresponding authentication response are valid, and
   drop the communication session signal when the particular authentication request or the corresponding authentication response is invalid.

2. The device of claim 1, where the one or more processors are further to:
   receive the plurality of authentication requests from a mobility management entity associated with a visited network,
      the plurality of authentication requests comprising a plurality of update location requests associated with a corresponding group of mobile devices; and forward the plurality of authentication requests to a group of home subscriber servers associated with a corresponding group of home networks,
the group of home subscriber servers being associated with the plurality of update location requests.

3. The device of claim 1, where the one or more processors are further to:
identify a plurality of identifiers associated with the plurality of authentication requests and the plurality of authentication responses,
the plurality of identifiers identifying a corresponding plurality of mobile devices;
store, as the authentication information, the plurality of identifiers;
determine whether the plurality of identifiers includes a particular identifier,
the particular identifier being associated with the communication session signal; and
determine whether the communication session signal is associated with the particular authentication request and the corresponding authentication response based on determining whether the plurality of identifiers includes the particular identifier.

4. The device of claim 1, where the one or more processors are further to:
identify, based on information included in the communication session signal, a particular mobile device associated with the communication session signal;
determine whether the particular authentication request identifies the particular mobile device;
determine whether the corresponding authentication response includes a particular answer associated with a successful authentication; and
determine that the communication session signal is associated with the particular authentication request and the corresponding authentication response based on determining that:
the particular authentication request identifies the particular mobile device, and
the corresponding authentication response includes the particular answer.

5. The device of claim 1, where the one or more processors are further to:
identify, based on information included in the communication session signal:
a particular mobile device associated with the communication session signal, and
a particular gateway device associated with the communication session signal; and
determine whether the communication session signal is associated with the particular authentication request and the corresponding authentication response based on determining whether the particular authentication request and the corresponding authentication response identify:
the particular mobile device, and
the particular gateway device.

6. The device of claim 1, where the one or more processors are further to:
receive the plurality of authentication requests and the plurality of authentication responses according to a diameter protocol,
the plurality of authentication requests being a plurality of location update requests, and
the plurality of authentication responses being a plurality of location update answers; and receive the communication session signal according to a tunneling protocol,
the communication session signal being associated with establishing a tunnel using the tunneling protocol.

7. The device of claim 1, where the one or more processors are further to:
forward the communication session signal to a first device based on determining that the communication session signal is associated with the particular authentication request and the corresponding authentication response;
forward another communication session signal, based on the communication session signal, to a second device,
the communication session signal and the other communication session signal being associated with establishing a communication session tunnel between the first device and the second device; and
drop the communication session signal, and the other communication session signal based on determining that the communication session signal is not associated with the particular authentication request and the corresponding authentication response.

8. A non-transitory computer-readable medium storing instructions, the instruction comprising;
one or more instructions that, when executed by one or more processors, cause the one or more processors to:
cause a set of packets to be forwarded between a first network device and
a second network device,
the first network device being associated with a first network, the second network device being associated with a second network, and the set of packets being associated with permitting access, by a set of mobile devices connected to the first network, to the second network;
generate and store configuration information based on the set of packets,
the configuration information identifying the set of mobile devices, and
the configuration information including a particular authentication request and a corresponding authentication response;
receive a request from a third network device,
the request being associated with establishing a communication session between the third network device and a fourth network device, and
the fourth network device being associated with the second network;
determine, based on the configuration information, whether a particular mobile device, associated with the request, is permitted to establish the communication session;
determine, based on determining that the particular mobile device is permitted to establish the communication session, whether the configuration information is valid based on whether a particular authentication, associated with the particular authentication request and the corresponding authentication response, satisfies a timeout threshold; and
selectively create the communication session when the particular mobile device is permitted to establish the communication session and when the configuration information is valid, and
prevent creation of the communication session when the particular mobile device is not permitted to establish the communication session or when the configuration information is invalid.

9. The non-transitory computer-readable medium of claim 8, where the instructions further comprise:
one or more instructions that, when executed by the one or more processors, cause the one or more processors to:
determine, based on the configuration information, whether a device identifier, included in the request, is associated with the set of mobile devices,
the device identifier being associated with identifying the particular mobile device; and
determine whether the particular mobile device is permitted to establish the communication session based on determining whether the device identifier is associated with the set of mobile devices.

10. The non-transitory computer-readable medium of claim 8, where the set of packets includes a first set of packets and a second set of packets corresponding to the first set of packets, and
the one or more instructions, that cause the one or more processors to forward the set of packets, cause the one or more processors to:
cause the first set of packets to be forwarded from the first network device to the second network device,
the first set of packets requesting permission for the set of mobile devices to access the second network; and
cause the second set of packets to be forwarded from the second network device to the first network device,
the second set of packets granting permission for the set of mobile devices to access the second network.

11. The non-transitory computer-readable medium of claim 10, where the instructions further comprise:
one or more instructions that, when executed by the one or more processors, cause the one or more processors to:
determine, based on the configuration information, whether a packet, of the first set of packets, identifies the particular mobile device;
determine, based on the configuration information, whether a corresponding packet, of the second set of packets, identifies the third network device; and
determine whether the particular mobile device is permitted to establish the communication session based on determining whether the packet identifies the particular mobile device and the corresponding packet identifies the third network device.

12. The non-transitory computer-readable medium of claim 8, where the instructions further comprise:
one or more instructions that when executed by the one or more processors, cause the one or more processors to:
cause the set of packets to be forwarded as authentication packets according to an authentication protocol; and
receive the request as a tunneling control signal according to a tunneling protocol.

13. The non-transitory computer-readable medium of claim 8, where the instructions further comprise:
one or more instructions that, when executed by the one or more processors, cause the one or more processors to:
selectively cause the request to be forwarded from the third network device to the fourth network device based on determining that the particular mobile device is permitted to establish the communication session.

14. The non-transitory computer-readable medium of claim 8, where the instructions further comprise:
one or more instructions that, when executed by the one or more processors, cause the one or more processors to:
determine, based on the configuration information, whether the third network device is associated with the first network;
determine, based on the configuration information, whether the particular mobile device is included in the set of mobile devices; and
determine whether the particular mobile device is permitted to establish the communication session based on determining whether the third network device is associated with the first network and the particular mobile device is included in the set of mobile devices.

15. A method, comprising:
receiving, by a device, a signal, the signal including:
a mobile device identifier corresponding to a mobile device, and a network device identifier corresponding to a network device;
determining, by the device, that the signal is associated with the network device authenticating the mobile device;
storing, by the device, information from the signal in an authentication cache, based on determining that the signal is associated with the network device authenticating the mobile device;
forwarding, by the device, the signal to the network device;
determining, by the device, that the signal is associated with establishing a communication session with the network device;
determining, by the device and based on the authentication cache, whether establishing the communication session is permitted, based on determining that the signal is associated with establishing the communication session;
determining, by the device and based on determining that establishing the communication session is permitted, whether the signal is valid based on whether a particular authentication, associated with the authentication cache, satisfies a timeout threshold; and
selectively forwarding, by the device, the signal to the network device when the communication session is permitted and when the signal is valid, and
dropping the signal when the communication session is not permitted or when the signal is invalid.

16. The method of claim 15, further comprising:
determining, based on the authentication cache, whether a previously received signal, associated with authenticating the mobile device, includes:
the mobile device identifier, and
the network device identifier.

17. The method of claim 15, further comprising:
storing in the authentication cache:
the mobile device identifier, and
the network device identifier.

18. The method of claim 15, further comprising:
determining whether the signal is associated with requesting authentication from the network device:
creating a new entry in the authentication cache based on determining that the signal is associated with requesting authentication from the network device,
the new entry including the mobile device identifier;

determining whether the signal is associated with providing authentication to the network device;
identifying communication session information included in the signal based on determining that the signal is associated with providing authentication to the network device,
identifying an existing entry from the authentication cache,
 the existing entry corresponding to the mobile device identifier; and
updating the existing entry to include the communication session information.

19. The method of claim 15, further comprising:
identifying, based on the signal, a first network associated with the mobile device and a second network associated with the network device,
 the first network being different from the second network; and
determining, based on the authentication cache, whether a previously received signal, associated with authenticating the mobile device, permits the mobile device to communicate, via the first network, with the second network.

20. The method of claim 19, further comprising:
receiving the signal from another network device; and
determining, based on the authentication cache, whether the other network device is associated with the first network.

* * * * *